(12) United States Patent
DeCristofaro et al.

(10) Patent No.: US 6,784,588 B2
(45) Date of Patent: Aug. 31, 2004

(54) LOW CORE LOSS AMORPHOUS METAL MAGNETIC COMPONENTS FOR ELECTRIC MOTORS

(75) Inventors: Nicholas J. DeCristofaro, Chatham, NJ (US); Gordon E. Fish, Montclair, NJ (US); Scott M. Lindquist, Myrtle Beach, SC (US); Carl E. Kroger, Aynor, SC (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 10/357,049

(22) Filed: Feb. 3, 2003

(65) Prior Publication Data

US 2004/0150285 A1 Aug. 5, 2004

(51) Int. Cl.⁷ .............................. H02K 1/00; H02K 1/06
(52) U.S. Cl. ...................................................... 310/216
(58) Field of Search ................................ 310/216, 254, 310/261; 428/611, 900

(56) References Cited

U.S. PATENT DOCUMENTS

| | | | |
|---|---|---|---|
| 4,197,146 A | 4/1980 | Frischmann | 148/31.55 |
| 4,201,837 A | 5/1980 | Lupinski | 428/457 |
| 4,343,347 A | 8/1982 | Liebermann et al. | 164/463 |
| 4,385,932 A | 5/1983 | Inomata et al. | 75/123 |
| 4,403,401 A | 9/1983 | Rosenberry | 29/596 |
| 4,716,556 A | 12/1987 | Raskin et al. | 367/168 |
| 4,763,030 A | 8/1988 | Clark et al. | 310/26 |
| 5,160,379 A | 11/1992 | Yoshizawa et al. | 148/108 |
| 5,252,877 A | 10/1993 | Sawa et al. | 310/214 |
| 5,258,681 A | 11/1993 | Hibino et al. | 310/214 |
| 5,270,595 A | 12/1993 | Wisner | 310/26 |
| 5,522,948 A | 6/1996 | Sawa et al. | 148/308 |
| 5,671,524 A | 9/1997 | Damsky et al. | 29/596 |
| 5,731,649 A | 3/1998 | Caamano | 310/216 |
| 5,873,954 A | 2/1999 | Liebermann et al. | 148/304 |
| 5,935,347 A | 8/1999 | Suzuki et al. | 148/121 |
| 6,346,337 B1 * | 2/2002 | DeCristofaro et al. | 428/692 |
| 6,348,275 B1 * | 2/2002 | DeCristofaro et al. | 428/692 |
| 6,462,456 B1 * | 10/2002 | DeCristofaro et al. | 310/216 |
| 6,675,459 B1 * | 1/2004 | DeCristofaro et al. | 29/596 |

FOREIGN PATENT DOCUMENTS

| | | | | |
|---|---|---|---|---|
| DE | 2805435 | 8/1979 | | H02K/1/06 |
| DE | 2805438 | 8/1979 | | H02K/1/06 |
| EP | 0058269 | 8/1982 | | B22D/11/06 |
| EP | 0430085 | 6/1991 | | H01F/1/153 |
| WO | WO96/00449 | 1/1996 | | H01F/41/02 |

* cited by examiner

*Primary Examiner*—Thanh Lam
*Assistant Examiner*—Judson H. Jones
(74) *Attorney, Agent, or Firm*—Ernest D. Buff & Associates, LLC; Ernest D. Buff; Gordon E. Fish

(57) ABSTRACT

A high efficiency electric motor has a generally polyhedrally shaped bulk amorphous metal magnetic component in which a plurality of layers of amorphous metal strips are laminated together adhesively to form a generally three-dimensional part having the shape of a polyhedron. The bulk amorphous metal magnetic component may include an arcuate surface, and preferably includes two arcuate surfaces that are disposed opposite to each other. The magnetic component is operable at frequencies ranging from about 50 Hz to about 20,000 Hz. When the motor is operated at an excitation frequency "f" to a peak induction level $B_{max}$, the component exhibits a core-loss less than about "L" wherein L is given by the formula $L=0.005\ f\ (B_{max})^{1.5}+0.000012\ f^{1.5}\ (B_{max})^{1.6}$, said core loss, said excitation frequency and said peak induction level being measured in watts per kilogram, hertz, and teslas, respectively. Performance characteristics of the bulk amorphous metal magnetic component of the present invention are significantly better than those of silicon-steel components operated over the same frequency range.

26 Claims, 8 Drawing Sheets

LOW CORE LOSS AMORPHOUS METAL MAGNETIC COMPONENTS FOR ELECTRIC MOTORS

BACKGROUND OF THE INVENTION

1. Field of the Invention

This invention relates to amorphous metal magnetic components, and more particularly, to a high efficiency electric motor having a generally polyhedrally shaped, low core loss, bulk amorphous metal magnetic component.

2. Description of the Prior Art

An electric motor typically contains magnetic components made from a plurality of stacked laminations of non-oriented electrical steel. In variable reluctance motors and eddy current motors, the stators are made from stacked laminations. Both the stator and the rotor are made from stacked laminations in squirrel cage motors, reluctance synchronous motors and switched reluctance motors. Each lamination is typically formed by stamping, punching or cutting the mechanically soft, non-oriented electrical steel into the desired shape. The formed laminations are then stacked and bound to form rotors or stators which have the desired geometry, along with sufficient mechanical integrity to maintain their configuration during production and operation of the motor.

The stator and the rotor in a machine are separated by small gaps that are either: (i) radial, i.e., generally perpendicular the axis of rotation of the rotor, or (ii) axial, i.e., generally parallel to the rotation axis and separated by some distance. In an electromagnetic machine, lines of magnetic flux link the rotor and stator by traversing the gaps. Electromagnetic machines thus may be broadly classified as radial or axial flux designs, respectively. The corresponding terms radial and axial gap designs are also used in the motor art. Radial flux machines are by far most common. The aforesaid punching and stacking methods are widely used for constructing rotors and stators for radial flux motors.

Although amorphous metals offer superior magnetic performance when compared to non-oriented electrical steels, they have long been considered unsuitable for use in bulk magnetic components such as the rotors and stators of electric motors due to certain physical properties and the ensuing impediments to fabrication. For example, amorphous metals are thinner and harder than non-oriented steel, and consequently cause fabrication tools and dies to wear more rapidly. The resulting increase in the tooling and manufacturing costs makes fabricating bulk amorphous metal magnetic components using such conventional techniques, such as punching and stamping, commercially impractical. The thinness of amorphous metals also translates into an increased number of laminations in the assembled components, further increasing the total cost of an amorphous metal rotor or stator magnet assembly.

Amorphous metal is typically supplied in a thin continuous ribbon having a uniform ribbon width. However, amorphous metal is a very hard material, making it very difficult to cut or form easily. Once annealed to achieve peak magnetic properties, amorphous metal ribbon becomes very brittle. This makes it difficult and expensive to use conventional approaches to construct a bulk amorphous metal magnetic component. The brittleness of amorphous metal ribbon may also cause concern for the durability of the bulk magnetic component in an application such as an electric motor.

Magnetic stators are subject to extremely high magnetic forces, which vary rapidly at the frequencies needed for high rotational speed. These magnetic forces are capable of placing considerable stresses on the stator material, and may damage an amorphous metal magnetic stator. Rotors are further subjected to mechanical forces due both to normal rotation and to rotational acceleration when the machine is energized or de-energized and when the loading changes, perhaps abruptly.

A limited number of non-conventional approaches have been proposed for constructing amorphous metal components. For example, U.S. Pat. No. 4,197,146 to Frischmann discloses a stator fabricated from molded and compacted amorphous metal flake. Although this method permits formation of complex stator shapes, the is structure contains numerous air gaps between the discrete flake particles of amorphous metal. Such a structure greatly increases the reluctance of the magnetic circuit and thus the electric current required to operate the motor.

The approach taught by German Patents DE 28 05 435 and DE 28 05 438 divides the stator into wound pieces and pole pieces. A non-magnetic material is inserted into the joints between the wound pieces and pole pieces, increasing the effective gap, and thus increasing the reluctance of the magnetic circuit and the electric current required to operate the motor. The layers of material that comprise the pole pieces are oriented with their planes perpendicular to the planes of the layers in the wound back iron pieces. This configuration further increases the reluctance of the stator, because contiguous layers of the wound pieces and of the pole pieces meet only at points, not along full line segments, at the joints between their respective faces. In addition, this approach teaches that the laminations in the wound pieces are attached to one another by welding. The use of heat intensive processes, such as welding, to attach amorphous metal laminations will recrystallize the amorphous metal at and around the joint. Even small sections of recrystallized amorphous metal will normally increase the magnetic losses in the stator to an unacceptable level.

Another difficulty associated with the use of ferromagnetic amorphous metals arises from the phenomenon of magnetostriction. Certain magnetic properties of any magnetostrictive material change in response to imposed mechanical stress. For example, the magnetic permeability of a component containing amorphous materials typically is reduced and the core losses increased when the component is subjected to stress. The degradation of soft magnetic properties of the amorphous metal device due to the magnetostriction phenomenon may be caused by stresses resulting from any combination of sources, including: (i) magnetic and mechanical forces during the operation of the electric motor; (ii) mechanical stresses resulting from mechanical clamping or otherwise fixing the bulk amorphous metal magnetic components in place; or (iii) internal stresses caused by the thermal expansion and/or expansion due to magnetic saturation of the amorphous metal material. As an amorphous metal magnetic stator is stressed, the efficiency at which it directs or focuses magnetic flux is reduced, resulting in higher magnetic losses, reduced efficiency, increased heat production, and reduced power. The extent of this degradation may be considerable depending upon the particular amorphous metal material and the actual intensity of the stresses, as indicated by U.S. Pat. No. 5,731,649. The degradation of core loss is often expressed as a destruction factor, i.e., a ratio of the core loss actually exhibited by a finished device and the inherent core loss of the constituent material tested under stress-free, laboratory conditions.

Moreover, amorphous metals have far lower anisotropy energies than other conventional soft magnetic materials, including common electrical steels. As a result, stress levels that would not have a deleterious effect on the magnetic properties of these conventional metals have a severe impact on magnetic properties important for motor components, e.g. permeability and core loss. For example, the '649 patent further discloses that forming amorphous metal cores by rolling amorphous metal into a coil, with lamination using an epoxy, detrimentally restricts the thermal and magnetic saturation expansion of the coil of material, resulting in Is high internal stresses and magnetostriction that reduces the efficiency of a motor or generator incorporating such a core. In order to avoid stress-induced degradation of magnetic properties, the '649 patent discloses a magnetic component comprising a plurality of stacked or coiled sections of amorphous metal carefully mounted or contained in a dielectric enclosure without the use of adhesive bonding.

A number of applications in current technology, including such widely diverse areas such as high-speed machine tools, aerospace motors and actuators, and spindle drive motors for magnetic and optical disk drives used for data storage in computers and other microelectronic devices, require electrical motors operable at high speeds, many times in excess of 15,000–20,000 rpm, and in some cases up to 100,000 rpm. The limitations of magnetic components made using existing materials entail substantial and undesirable design compromises. In many applications, the core losses of the electrical steels typically used in motor components are prohibitive. In such cases a designer may be forced to use a permalloy alloy as an alternative. However, the attendant reduction in saturation induction (e.g. 0.6–0.9 T or less for various permalloy alloys versus 1.8–2.0 T for ordinary electrical steels) necessitates an increase in the size of magnetic components comprised of permalloy or variants thereof. Furthermore, the desirable soft magnetic properties of the permalloys are adversely and irreversibly affected by plastic deformation, which can occur at relatively low stress levels. Such stresses may occur either during manufacture or operation of the permalloy component.

Notwithstanding the advances represented by the above disclosures, there remains a need in the art for improved amorphous metal motor components that exhibit a combination of excellent magnetic and physical properties needed for high speed, high efficiency electric machines. Construction methods are also sought that use amorphous metal efficiently and can be implemented for high volume production of motors of various types and of the components used therein.

SUMMARY OF THE INVENTION

The present invention provides a high efficiency electric motor comprising one or more low-loss bulk amorphous metal magnetic components having the shape of a polyhedron and being comprised of a plurality of layers of amorphous metal strips. Also provided by the present invention is a method for making a low core loss, bulk amorphous metal magnetic component. More specifically, a magnetic component constructed in accordance with one embodiment of the present invention and excited at an excitation frequency "f" to a peak induction level "$B_{max}$" will have a core loss at room temperature less than "L" wherein L is given by the formula $L=0.005\ f\ (B_{max})^{1.5} 0.000012\ f^{1.5} (B_{max})^{1.6}$, the core loss, the excitation frequency and the peak induction level being measured in watts per kilogram, hertz, and teslas, respectively. Preferably, the magnetic component has (i) a core-loss of less than or approximately equal to 2.8 watt-per-kilogram of amorphous metal material when operated at a frequency of approximately 400 Hz and at a flux density of approximately 1.3 Tesla (T); (ii) a core-loss of less than or approximately equal to 5.7 watts-per-kilogram of amorphous metal material when operated at a frequency of approximately 800 Hz and at a flux density of approximately 1.3 T, or (iii) a core-loss of less than or approximately equal to 9.5 watt-per-kilogram of amorphous metal material when operated at a frequency of approximately 2,000 Hz and at a flux density of approximately 1.0 T.

As a result of its very low core losses under periodic magnetic excitation, the magnetic component of the invention is operable at frequencies ranging from DC to as much as 20,000 Hz or more. It exhibits improved performance characteristics when compared to conventional silicon-steel magnetic components operated over the same frequency range. The component's operability at high frequency allows it to be used in fabricating motors that advantageously are operable at higher speeds and with higher efficiencies than are possible using components made with conventional materials.

The present invention also provides a method of constructing a bulk amorphous metal magnetic component. An implementation of the method includes the steps of forming a plurality of laminations of a predetermined requisite shape from ferromagnetic amorphous metal strip feedstock, stacking the laminations in registry to form a three-dimensional shape, and applying and activating adhesive means to adhesively bond the laminations to each other forming a lamination stack having sufficient structural and mechanical integrity. Advantageously, compressive and tensile stresses that result inherently from bending strip during winding are absent in a fabrication method that employs individually formed laminations. Any stress resulting from the formation of the laminations will likely be confined merely to a small region at or near the periphery thereof. Optionally the lamination stack is then finished to remove any excess adhesive and to give it a suitable surface finish and final component dimensions.

The formation of laminations in the requisite shape may be carried out in a number of ways, including non-exclusively cutting by mechanical grinding, diamond wire, high-speed milling performed in either horizontal or vertical orientation, abrasive water jet milling, electric discharge machining by wire or plunge, electrochemical grinding, electrochemical machining, stamping, laser cutting, or other means known to one having ordinary skill. Preferably, laminations are formed by a photolithographic etching technique. The adhesive bonding step may be carried out before or after the annealing step. The method may further comprise an optional heat treatment or annealing to improve the magnetic properties of the component or an optional coating step wherein an insulating coating is applied to at least a portion of the surface of the component. These steps may be carried out in a variety of orders and using a variety of techniques including those set forth hereinbelow. The preferred amorphous metal material preferably used in the practice of the method has a composition defined essentially by the formula $Fe_{80}B_{11}Si_9$.

The present invention is also directed to a bulk amorphous metal motor component constructed in accordance with the above-described methods.

Bulk amorphous metal magnetic components constructed in accordance with the present invention are especially suited for use as amorphous metal stators or stator components in highly efficient, variable reluctance motors and eddy current motors. Similarly, bulk amorphous metal components may be used as both the rotor and the stator in squirrel cage motors, reluctance synchronous motors and switched reluctance motors. It will be understood by those skilled in the art that such motors may comprise one or more rotors and one or more stators. Accordingly, the terms "a rotor" and "a stator" as used herein with reference to motors mean a number of rotors and stators ranging from 1 to as many as three or more. It will further be recognized by those familiar with the rotating electrical machine art that radial flux motors may be constructed either: with (i) the rotor located within, and having a generally smaller diameter than, the stator or (ii) in the inside-out or cup configuration in which the relative positions and sizes of the rotor and stator are exchanged. A rotor or a stator of the invention may be constructed either as a unitary structure or as an assembly of a plurality of sub-structures held together by known means, the sub-structures being made as taught herein.

It will also be recognized by those skilled in the art that the term "electric motor," as used herein, refers generically to a variety of rotating electrical machines which additionally comprise electric generators as well as regenerative motors that may be operated optionally as electric generators. The magnetic component of the invention may be employed in constructing any of these devices. Significant advantages are realized during use of the present invention. These advantages include simplified manufacturing and reduced manufacturing time, reduced stresses (i.e., magnetostrictive) encountered during construction of bulk amorphous metal components, optimized performance of the finished amorphous metal magnetic component, and improved efficiency of an electric motor comprising the rotor or stator disclosed herein.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DETAILED DESCRIPTION OF THE INVENTION

The present invention is directed to high efficiency motors constructed using low-loss bulk amorphous metal components such as, for example, stators, rotors, and component parts for stators and rotors. Generally polyhedrally shaped bulk amorphous metal components are constructed in accordance with the present invention having various geometries including, but not limited to, rectangular, square, prism. In addition, any of the previously mentioned geometric shapes may include at least one arcuate surface, and preferably two oppositely disposed arcuate surfaces to form a generally curved or arcuate bulk amorphous metal component. The invention also provides components wherein the polyhedral shape is generally cylindrical and may further comprise a plurality of teeth extending radially inward or outward from a generally annular portion. Furthermore, complete stators and rotors may be constructed as bulk amorphous metal components in accordance with the present invention. Those stators and rotors may have either a unitary construction or they may be formed from a plurality of pieces, which collectively form the completed component. Alternatively, a stator and/or rotor may be a composite structure comprised entirely of amorphous metal parts or a combination of amorphous metal parts with other magnetic materials. The bulk magnetic component of the invention may be incorporated in an electric motor, preferably of the radial flux variety.

Figure 1:
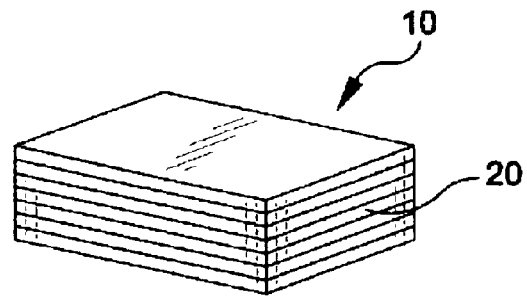
FIG. 1 is a perspective view of a bulk amorphous metal magnetic component in the shape of a three-dimensional rectangle constructed in accordance with the present invention.

Referring now to FIG. 1 of the drawings, there is shown a generally polyhedrally shaped bulk amorphous metal motor component 10. As used herein, the term polyhedron refers to a multi-faced or sided solid. This includes, but is not limited to, three-dimensional rectangles, squares, trapezoids, and prisms. In addition, any of the previously mentioned geometric shapes may include at least one, and preferably two, arcuate surfaces or sides that are disposed opposite each other to form a generally arcuately shaped component. The component of the invention may also have a generally cylindrical shape. The magnetic component 10 depicted by FIG. 1 is comprised of a plurality of substantially similarly shaped layers of amorphous metal strip material 20 that are laminated together and annealed. A three-dimensional magnetic component 10 constructed in accordance with the present invention and excited at an excitation frequency "f" to a peak induction level "$B_{max}$" has a core loss at room temperature less than about "L" wherein L is given by the formula $L=0.005\ f\ (B_{max})^{1.5}+0.000012\ f^{1.5}\ (B_{max})^{1.6}$, the core loss, the excitation frequency and the peak induction level being measured in watts per kilogram, hertz, and teslas, respectively. In certain preferred embodiments, the magnetic component has (i) a core-loss of less than or approximately equal to 2.8 watt-per-kilogram of amorphous metal material when operated at a frequency of approximately 400 Hz and at a flux density of approximately 1.3 Tesla (T); (ii) a core-loss of less than or approximately equal to 5.7 watts-per-kilogram of amorphous metal material when operated at a frequency of approximately 800 Hz and at a flux density of approximately 1.3 T, or (iii) a core-loss of less than or approximately equal to 9.5 watt-per-kilogram of amorphous metal material when operated at a frequency of approximately 2,000 Hz and at a flux density of approximately 1.0 T.

The component of the invention advantageously exhibits low core loss when the component or any portion thereof is magnetically excited along any direction substantially within the plane of the amorphous metal pieces comprised therein. The reduced core loss of the component of the invention in turn improves the efficiency of an electric motor comprising it. The low values of core loss make the bulk magnetic component of the invention especially suited for use in motors wherein a high pole count or a high rotational speed necessitates a high frequency magnetic excitation, e.g., excitation at above 100 Hz. The inherent high core loss of conventional steels at high frequency generally renders them unsuitable for use in motors requiring high frequency excitation. These core loss performance values apply to the various embodiments of the present invention, regardless of the specific geometry of the bulk amorphous metal component.

Figure 2A:
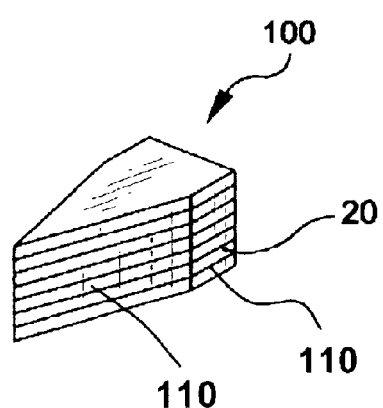
FIG. 2A is a perspective view of a bulk amorphous metal magnetic component having the shape of a prism and constructed in accordance with the present invention.

The magnetic component 100 depicted by FIG. 2A is generally prism-shaped and preferably includes five (5) sides 110 or surfaces. The pentagonally-shaped polyhedron component 100 is comprised of a plurality of layers of amorphous metal strip material 20 that are each substantially the same size and shape. The strip material 20 is stacked, laminated together and then annealed.

Figure 2B:
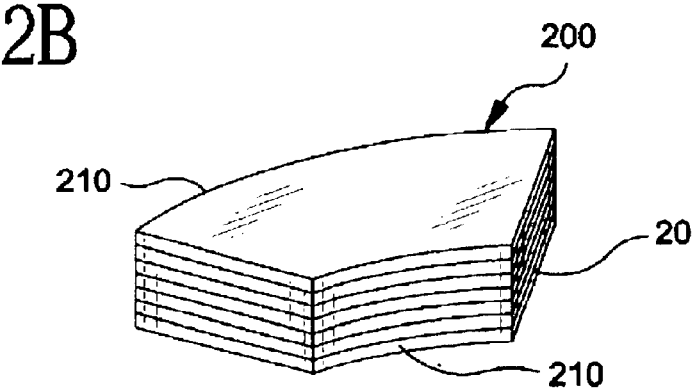
FIG. 2B is a perspective view of a bulk amorphous metal magnetic component having oppositely disposed arcuate surfaces and constructed in accordance with the present invention.

The magnetic component 200 depicted by FIG. 2B includes at least one, and preferably two oppositely disposed arcuate surfaces 210. The arcuately-shaped component 200 is comprised of a plurality of layers of amorphous metal strip material 20 that are each substantially the same size and shape and that are stacked, laminated together, and annealed.

Figure 2C:
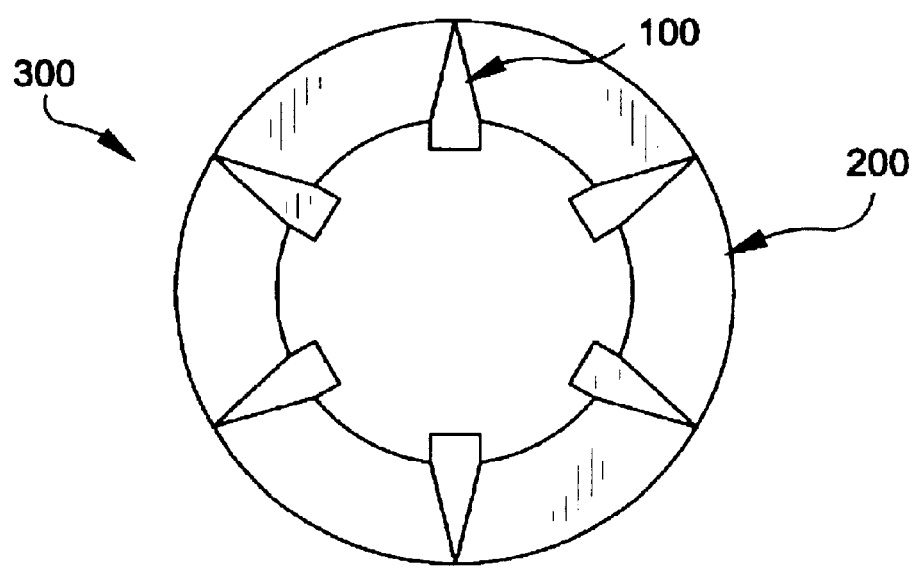
FIG. 2C is a top view of a stator for an electric motor constructed from six prism-shaped components as depicted in FIG. 2A and six arcuate components as depicted in FIG. 2B.

The bulk amorphous metal magnetic component 300 depicted by FIG. 2C may be used as a stator for a radial gap electric motor and is comprised of six pieces of magnetic component 100 and six pieces of magnetic component 200.

Figure 3A:
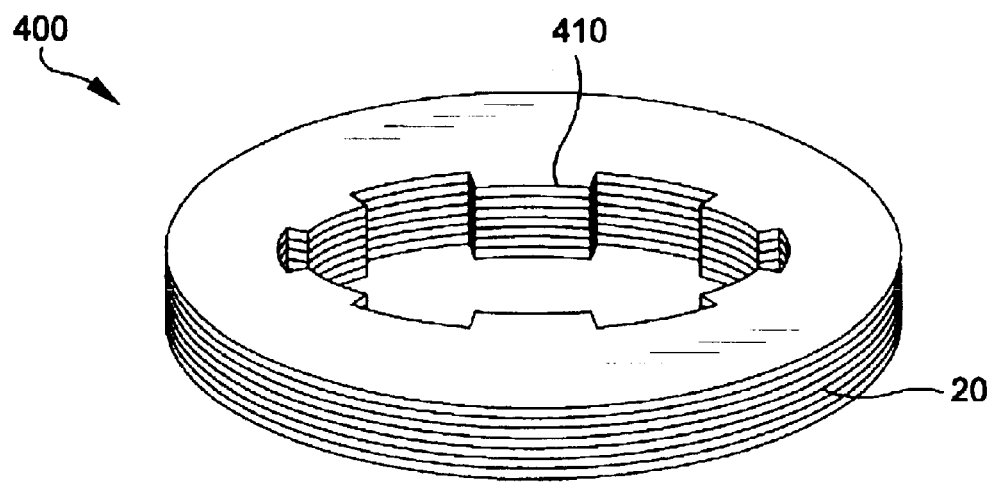
FIG. 3A is a perspective view of a bulk amorphous metal magnetic stator for an electric motor constructed in accordance with the present invention.

The bulk amorphous metal magnetic component 400 depicted by FIG. 3A is generally circular and includes a plurality of generally rectangular teeth 410 that extend radially inward toward the center of the circular component 400. The component 400 is comprised of a plurality of layers of amorphous metal strip material 20 that are each substantially the same size and shape and that are stacked, laminated together, and then annealed. A bulk amorphous metal component constructed in accordance with the embodiment of FIG. 3A may be used as a stator in a radial air gap electric motor.

Figure 3B:
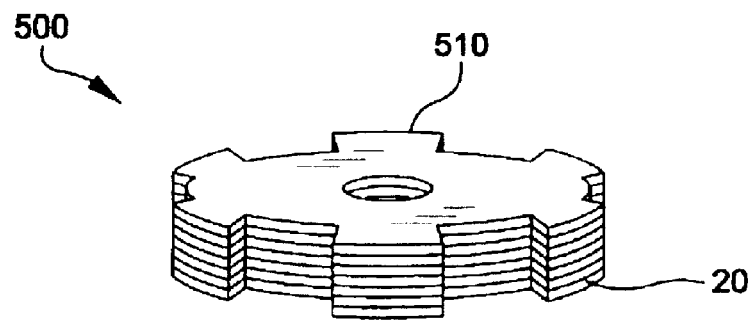
FIG. 3B is a perspective view of a bulk amorphous metal magnetic rotor for an electric motor constructed in accordance with the present invention.

The bulk amorphous metal component 500 depicted in FIG. 3B is generally disc-shaped and includes a plurality of generally rectangular teeth 510 that extend radially outward. The component 500 is comprised of a plurality of layers of amorphous metal strip material 20 that are each substantially the same size and shape and that are stacked, laminated together, and annealed. The annealing may be carried out either before or after the lamination. A bulk amorphous metal component constructed in accordance with the embodiment of FIG. 3B may be used as a rotor in a radial air gap electric motor.

Figure 3C:
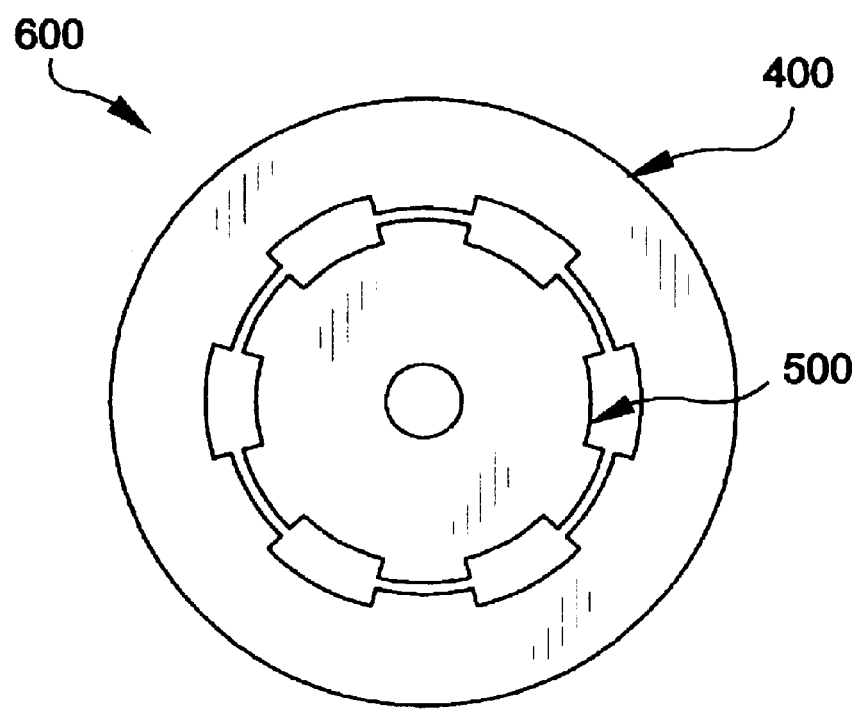
FIG. 3C is a top view of the stator and rotor for an electric motor constructed from the stator of FIG. 3A and the rotor of FIG. 3B.

Referring next to FIG. 3C, a stator 400 and rotor 500 are constructed as bulk amorphous metal components in accordance with the present invention and used as part of a high efficiency radial air gap electric motor 600. The motor further comprises windings and bearings that rotatably support rotor 500 in alignment with stator 400, as will be recognized by one skilled in the motor art.

Figure 3D:
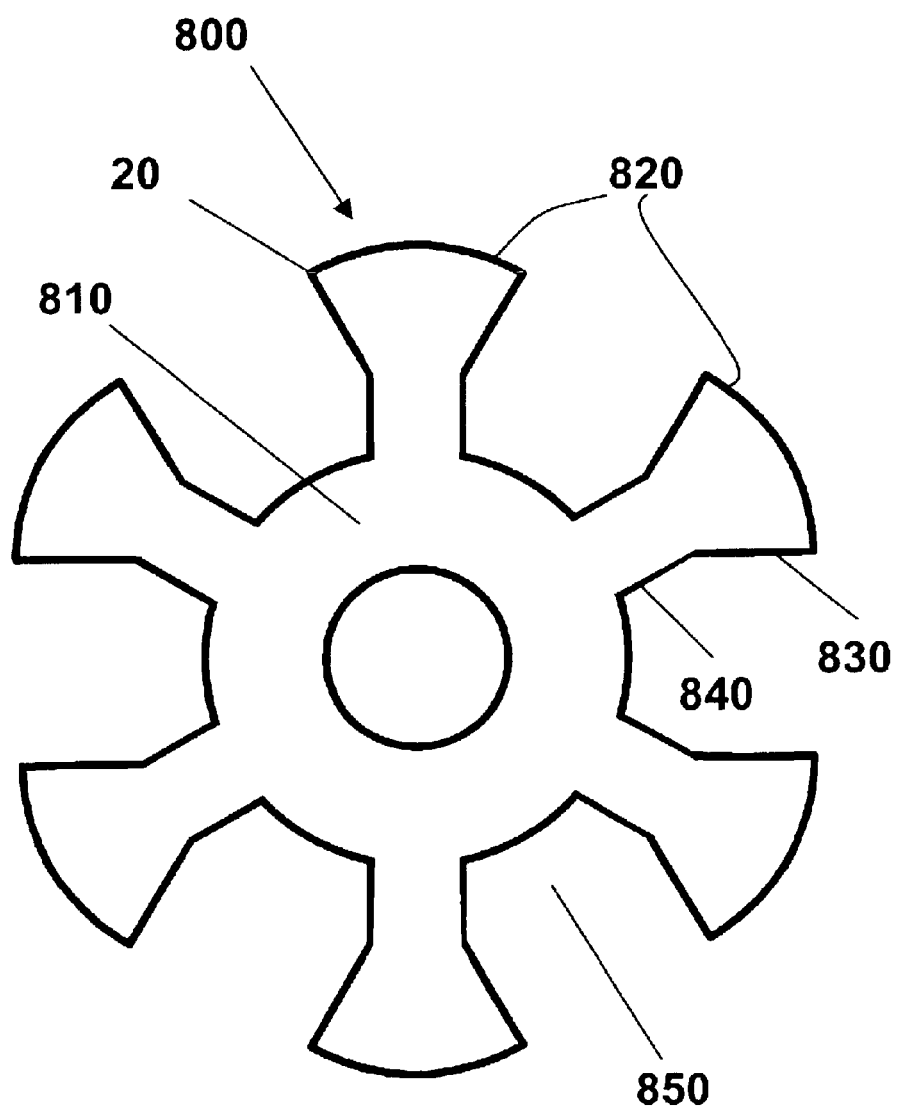
FIG. 3D is a top view of a bulk amorphous metal magnetic stator for an inside-out, radial gap electric motor constructed in accordance with the present invention.

The bulk amorphous component 800 depicted by FIG. 3D may be used as a stator in a high efficiency, inside-out, radial air gap electric motor. Component 800 comprises a plurality of laminations 20 substantially identical in shape. Each lamination 20 includes a central portion 810 having a generally annular size and shape, and a plurality of tooth portions 820 which extend radially outward from the central portion 810. The tooth portions 820 are often called, simply, teeth. Laminations 20 are cut in the requisite shape by any suitable process, photolithographic etching methods being preferable. The cut laminations are then stacked in registry and bonded together by adhesive impregnation to form component 800. The impregnation serves to disperse and infiltrate adhesive agent between the laminations, whereby at least a portion of the surface of each lamination is covered by the agent. In operation of component 800 as a stator in an electric motor, central portion 810 functions as back iron, that is, a flux return path, for magnetic flux lines that enter and exit the stator through teeth 820. Each of teeth 820 may have a widened portion 830 toward its extremity at the outside, peripheral circumference of component 800. The portion 840 of each tooth 820 proximate central portion 810 is often called the tooth root. A winding slot 850 is formed by the gap between each adjacent pair of teeth 820. When configured for incorporation in a motor, electrical windings (not depicted) encircle each tooth 820, passing through winding slots 850 aside that tooth. During motor operation, the windings are energized by a flow of electric current to provide magnetomotive force. The windings of the individual teeth may be interconnected and electrically energized in a variety of ways known in the motor art.

There is further provided a method for constructing the low loss component of the invention. In one aspect, individual laminations of the requisite shape are prepared from amorphous metal strips and subsequently stacked to form a three-dimensional lamination stack and bonded. In another aspect, the component is prepared by cutting to the requisite shape a workpiece comprising a bonded stack of amorphous metal strips. Such a workpiece may have the form of a rectangular brick, a wound structure, or any other suitable shape. The bonding preferably comprises applying and activating adhesive means to adhere the laminations to each other and thereby give the lamination stack sufficient mechanical and structural integrity for the component to be handled and operated in a finished device. Optionally the component is finished to accomplish at least one of: (i) removing excess adhesive; (ii) giving the component a suitable surface finish; and (iii) removing material whereby the stack is given its final component dimensions. The method further comprises an optional annealing step to improve the magnetic properties of the component. The steps of the method may be carried out in a variety of orders and using a variety of techniques, including those set forth herein and others, which will be obvious to those skilled in the art.

Numerous cutting techniques may be used in forming the present component. In some implementations of the method, individual laminations are cut to shape. A method especially preferred for cutting small, intricately shaped laminations, is photolithographic etching, which is often termed simply, photoetching. Generally stated, photolithographic etching is a technique for forming pieces of a material supplied in the form of a relatively thin sheet, strip, or ribbon. The photoetching process may comprise the steps of: (i) applying to each surface of the sheet a layer of a photoresistive substance responsive to the impingement thereon of light; (ii) placing on each sheet surface a photographic mask having regions of relative transparency and opacity defining a preselected shape; (iii) impinging light from a light source through each mask onto the surface to selectively expose those regions of the photoresistive substance located behind the transparent areas of the mask; (iv) developing the photoresistive substance by treatment with heat or chemical agents that causes the exposed regions of the photoresistive layer to be differentiated from the unexposed regions; (v) selectively removing the exposed portions of the developed photoresistive layer; and (vi) placing the sheet in a bath of corrosive agent that selectively etches or erodes material from those portions of the sheet from which the developed photoresist has been removed but does not erode portions on which photoresist remains, thereby forming laminations having the preselected shape. It is necessary that the masks on the opposite surfaces of the sheet material be registered to ensure that laminations having the desired shape and well-defined edges are obtained. In some implementations the mask optionally will include features that define small holding regions that leave each lamination weakly connected to the sheet for ease of handling prior to final assembly. These holding regions are easily severed to allow removal of individual laminations from the main sheet. A further chemical step is also normally used to remove residual photoresist from the laminations after the corrosive etching step. Those skilled in the art will also recognize photolithographic etching processes that use complementary photoresist materials in which the unexposed portions of the photoresist are selectively removed in step (v) above, instead of exposed portions. Of course, such a change also necessitates the transposition of the opaque and transparent regions in the photomask to create the same final lamination structure.

Methods of forming laminations that do not produce burrs or other edge defects are especially preferred. More specifically, these and other defects that protrude from the plane of the lamination are formed in some processes and under certain conditions. The defects frequently produce interlaminar electrical shorting which, in turn, deleteriously increases the component's iron loss.

Advantageously, photoetching of a part generally has been found to greatly minimize or eliminate the incidence of such edge defects. Typically photoetched parts exhibit rounded edges and tapering of the part's thickness in the immediate vicinity of the edges, thereby reducing the likelihood of the aforementioned interlaminar shorting in a lamination stack of such parts. In addition, the impregnation of such a stack with an adhesive agent is facilitated by the enhancement of wicking and capillary action in the vicinity of the tapered edges. Providing of one or more small holes through each lamination may further improve the efficacy of impregnation. When the individual laminations are stacked in registry, the holes may be aligned to create a channel through which an impregnant may readily flow, thereby assuring better distribution of the impregnant over at least a substantial area of the surface at which each lamination is mated with the adjacent laminations. Other structures, such as surface channels and slots may also be incorporated into each lamination that also may serve as impregnant flow enhancement means. The aforementioned holes and flow enhancement means are readily and effectively produced in photoetched laminations. In addition, various spacers may be interposed in the lamination stack to promote flow enhancement.

Suitable high strain rate stamping processes may also be used to form individual laminations for the practice of the invention. Historically, two factors have combined to preclude the use of stamping as a viable approach to forming amorphous metal parts. First and foremost, amorphous metals tend to be significantly harder than typical metallic punch and die materials. Iron based amorphous metal typically exhibits hardness in excess of 1100 kg/mm$^2$. By comparison, air cooled, oil quenched and water quenched tool steels are restricted to hardness in the 800 to 900 kg/mm$^2$ range. Thus, the amorphous metals, which derive their hardness from their unique atomic structures and chemistries, are harder than conventional metallic punch and die materials.

Secondly, amorphous metals undergo significant deformation prior to failure when constrained between the punch and die during stamping. Amorphous metals deform by highly localized shear flow. When deformed in tension, such as when an amorphous metal strip is pulled, the formation of a single shear band can lead to failure at small, overall deformation. In tension, failure can occur at an elongation of 1% or less. However, when deformed in a manner such that a mechanical constraint precludes plastic instability, such as in bending between the tool and die during stamping, multiple shear bands are formed and significant localized deformation can occur. In such a deformation mode, the elongation at failure can locally exceed 100%.

These two factors, exceptional hardness plus significant deformation, combine to produce extraordinary wear on the punch and die components of conventional stamping equipment. Wear on the punch and die is believed to occur by direct abrasion of the hard amorphous metal rubbing against the softer punch and die materials during deformation prior to failure.

In order to minimize the wear on the punch and die during the stamping process, the punch and die may be fabricated from advanced materials, and the tooling is such that the clearance between the punch and the die is small and uniform. The stamping process is also operated at high strain rates. The advanced materials used for the punch and die tooling should have a hardness of at least 1100 kg/mm$^2$ and preferably greater than 1300 kg/mm$^2$. Suitable advanced materials may include carbides, carbide metal composites, ceramics, ceramic metal composites, and amorphous metals. Tooling with hardness equal to or greater than that of amorphous metal will resist direct abrasion from the amorphous metal during the stamping process thereby minimizing the wear on the punch and die. The clearance between the punch and the die should be less than 0.125 mm (0.005 inch) and preferably less than 0.0125 mm (0.0005 inch). The strain rate used in the stamping process should be at least one punch stroke per second and preferably at least five punch strokes per second. The small clearance between the punch and the die and the high strain rate used in the stamping process combine to limit the amount of mechanical deformation of the amorphous metal prior to failure during the stamping process. Limiting the mechanical deformation of the amorphous metal in the die cavity limits the direct abrasion between the amorphous metal and the punch and die process thereby minimizing the wear on the punch and die. The high strain rate stamping process may be used to punch individual laminations by providing a single ribbon feed or multiple laminations (e.g. up to about 5) with a multi-ply feed.

An optional mild heat treatment of the strip material prior to stamping beneficially alters the mechanical properties of the amorphous metal. Specifically, heat treatment will somewhat reduce the ductility of the amorphous metal, thereby limiting the amount of mechanical deformation in the amorphous metal prior to fracture during the stamping process. Reduced ductility of the amorphous metal will also reduce the direct abrasion and wear of the punch and die materials by the deforming amorphous metal.

Alternatively, the present component is prepared from a bonded stack comprising a substantial number of amorphous metal ribbon strips, e.g. a stack having 100 or more layers. Suitable methods for accomplishing the required cutting include, but are not limited to, use of an abrasive cutting blade or wheel, mechanical grinding, diamond wire cutting, high-speed milling performed in either horizontal or vertical orientation, abrasive water jet milling, electric discharge machining by wire or plunge, electrochemical grinding, electrochemical machining, and laser cutting. In some cases, a full stack height may be cut in one operation. Some of these techniques may also be used to cut the aforementioned individual laminations or a small number of bonded or unbonded layers. It is preferred that the cutting method not produce any appreciable damage such as smearing at or near a cut surface. For example, such damage may be simple mechanical damage due to deformation of the amorphous metal or thermal damage due to heat generated by the cutting process. Thermal damage may include heating the amorphous metal material above its crystallization temperature or melting the material at or near the edge. The adverse results may include increased stress and core loss in the vicinity of the edge, interlaminar shorting, or degradation of mechanical properties.

Adhesive means are used in the practice of this invention to adhere a plurality of pieces or laminations of amorphous metal strip material in suitable registry to each other, thereby providing a bulk, three-dimensional object. This bonding affords sufficient structural integrity that permits the present component to be handled and used, or incorporated into a larger structure. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength. The adhesive may cover any fraction of the surface area of each lamination sufficient to effect adequate bonding of adjacent laminations to each other and thereby impart sufficient strength to give the finished component mechanical integrity. The adhesive may cover up to substantially all the surface area. Epoxies may be either multi-part whose curing is chemically activated or single-part whose curing is activated thermally or by exposure to ultra-violet radiation. Preferably, the adhesive has a viscosity of less than 1000 cps and a thermal expansion coefficient approximately equal to that of the metal, or about 10 ppm. One preferred adhesive is a thermally activated epoxy sold under the tradename Epoxylite 8899 by the P. D. George Co. The device of the invention is preferably bonded by impregnation with this epoxy, diluted 1:5 by volume with acetone to reduce its viscosity and enhance its penetration between the layers of the ribbon. Another adhesive found to be preferable is a methyl cyanoacrylate sold under the trade name Permabond 910FS by the National Starch and Chemical Company. The device of the invention is preferably bonded by applying this adhesive such that it will penetrate between the layers of the ribbon by capillary action. Permabond 910FS is a single part, low viscosity liquid that will cure at room temperature in the presence of moisture in 5 seconds.

Suitable methods for applying the adhesive include dipping, spraying, brushing, and electrostatic deposition. In strip or ribbon form amorphous metal may also be coated by passing it over rods or rollers which transfer adhesive to the amorphous metal. Rollers or rods having a textured surface, such as gravure or wire-wrapped rollers, are especially effective in transferring a uniform coating of adhesive onto the amorphous metal. The adhesive may be applied to an individual layer of amorphous metal at a time, either to strip material prior to cutting or to laminations after cutting. Alternatively, the adhesive means may be applied to the laminations collectively after they are stacked. Preferably, the stack is impregnated by capillary flow of the adhesive between the laminations. The impregnation step may be carried out at ambient temperature and pressure. Alternatively but preferably, the stack may be placed either in vacuum or under hydrostatic pressure to effect more complete filling, yet minimizing the total volume of adhesive added, thus assuring high stacking factor. A low-viscosity adhesive agent, such as an epoxy or cyanoacrylate is preferably used. Mild heat may also be used to decrease the viscosity of the adhesive, thereby enhancing its penetration between the lamination layers. The adhesive is activated as needed to promote its bonding. After the adhesive has received any needed activation and curing, the component may be finished to remove any excess adhesive and to give it a suitable surface finish and the final required component dimensions. If carried out at a temperature of at least about 175° C., the activation or curing of the adhesive may also serve to affect magnetic properties as discussed in greater detail hereinbelow.

The finishing of the component of the invention may further comprise application of an external coating to at least a portion of its external surface. Suitable coatings include paint, lacquer, varnish, or resins. The coating may be applied by various methods, including spraying and immersion in a bath or fluidized bed. Simple spraying techniques either with or without a solvent carrier may be used. Alternatively, electrostatic or electrophoretic deposition techniques are suitable. If required, the finishing operation may also include removal of any excess coating, especially an excess present in regions of close clearance between mutually rotating portions of the motor. An external coating beneficially protects the insulation of electrical windings on rotors or stators from abrasion at sharp metal edges and acts to trap any flakes or other material which might tend to come off the component and be attracted to a permanent magnet or otherwise become lodged inappropriately in the motor or other nearby structure.

Construction in the manner disclosed herein is especially suited for magnetic components such as amorphous metal stators and rotors for electric motors. Magnetic component manufacturing is simplified and manufacturing time is reduced. Stresses otherwise encountered during the construction of bulk amorphous metal components are minimized. Magnetic performance of the finished components is optimized. The various process steps described herein may be carried out in the sequence listed, or in other orders that will be apparent to one skilled in the relevant art.

The bulk amorphous metal magnetic component of the present invention can be manufactured using numerous amorphous metal alloys. Generally stated, the alloys suitable for use in constructing the component of the present invention are defined by the formula: $M_{70-85} Y_{5-20} Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta and W, and (ii) up to ten (10) atom percent of components (Y+Z) can be replaced by at least one of the non-metallic species In, Sn, Sb and Pb. As used herein, the term "amorphous metallic alloy" means a metallic alloy that substantially lacks any long range order and is characterized by X-ray diffraction intensity maxima which are qualitatively similar to those observed for liquids or inorganic oxide glasses.

Amorphous metal alloys suitable as feedstock in the practice of the invention are commercially available, generally in the form of continuous thin strip or ribbon in widths up to 20 cm or more and in thicknesses of approximately 20–25 μm. These alloys are formed with a substantially fully glassy microstructure (e.g., at least about 80% by volume of material having a non-crystalline structure). Preferably the alloys are formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M," "Y," and "Z" are at least predominantly iron, boron, and silicon, respectively. Accordingly, it is preferred that the alloy contain at least 70 atom percent Fe, at least 5 atom percent B, and at least 5 atom percent Si, with the proviso that the total content of B and Si be at least 15 atom percent. Amorphous metal strip composed of an iron-boron-silicon alloy is also preferred. Most preferred is amorphous metal strip having a composition consisting essentially of about 11 atom percent boron and about 9 atom percent silicon, the balance being iron and incidental impurities. This strip, having a saturation induction of about 1.56 T and a resistivity of about 137 $\mu\Omega$-cm, is sold by Honeywell International Inc. under the trade designation METGLAS® alloy 2605SA-1. Another suitable amorphous metal strip has a composition consisting essentially of about 13.5 atom percent boron, about 4.5 atom percent silicon, and about 2 atom percent carbon, the balance being iron and incidental impurities. This strip, having a saturation induction of about 1.59 T and a resistivity of about 137 $\mu\Omega$-cm, is sold by Honeywell International Inc. under the trade designation METGLAS® alloy 2605SC. For applications in which even higher saturation induction is desired, strip having a composition consisting essentially of iron, along with about 18 atom percent Co, about 16 atom percent boron, and about 1 atom percent silicon, the balance being iron and incidental impurities, is suitable. Such strip is sold by Honeywell International Inc. under the trade designation METGLAS® alloy 2605CO. However, losses of a component constructed with this material tend to be slightly higher than those using METGLAS 2605SA-1.

As is known in the art, a ferromagnetic material may be characterized by its saturation induction or equivalently, by its saturation flux density or magnetization. The alloy suitable for use in the present invention preferably has a saturation induction of at least about 1.2 tesla (T) and, more preferably, a saturation induction of at least about 1.5 T. The alloy also has high electrical resistivity, preferably at least about 100 $\mu\Omega$-cm, and most preferably at least about 130 $\mu\Omega$-cm.

The mechanical and magnetic properties of the amorphous metal strip appointed for use in the component generally may be enhanced by thermal treatment at a temperature and for a time sufficient to provide the requisite enhancement without altering the substantially fully glassy microstructure of the strip. The heat treatment comprises a heating portion, an optional soak portion and a cooling portion. A magnetic field may optionally be applied to the strip during at least a portion, such as during at least the cooling portion, of the heat treatment. Application of a field, preferably substantially along the direction in which flux lies during operation of the stator, may in some cases further improve magnetic properties of the component and reduce its core loss. Optionally, the heat treatment comprises more than one such heat cycle. Furthermore, the one or more heat treatment cycles may be carried out at different stages of the component manufacture. For example, discrete laminations may be treated or the lamination stack may be heat treated either before or after adhesive bonding. Preferably, the heat treatment is carried out before bonding, since many otherwise attractive adhesives will not withstand the requisite heat treatment temperatures.

The thermal treatment of the amorphous metal may employ any heating means which results in the metal experiencing the required thermal profile. Suitable heating means include infra-red heat sources, ovens, fluidized beds, thermal contact with a heat sink maintained at an elevated temperature, resistive heating effected by passage of electrical current through the strip, and inductive (RF) heating. The choice of heating means may depend on the ordering of the required processing steps enumerated above.

The magnetic properties of certain amorphous alloys suitable for use in component may be significantly improved by heat treating the alloy to form a nanocrystalline microstructure. This microstructure is characterized by the presence of a high density of grains having average size less than about 100 nm, preferably less than 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of the motor. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished bulk magnetic component. Such formation is advantageously accomplished while the alloy is still in its as-cast, ductile, substantially non-crystalline form, before it is heat treated to form the nanocrystalline structure which generally renders it more brittle and more difficult to handle.

Two preferred classes of alloy having magnetic properties significantly enhanced by formation therein of a nanocrystalline microstructure are given by the following formulas in which the subscripts are in atom percent.

A first preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4 \times 10^{-6}$). Such an alloy is especially preferred for applications wherein a motor of minimum size for the required power and torque is demanded.

A second preferred class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0 T, an especially low core loss, and low saturation magnetostriction (e.g. a magnetostriction having an absolute value less than $4 \times 10^{-6}$). Such an alloy is especially preferred for use in a motor required to operate at very high speed (e.g., requiring an excitation frequency of 100 Hz or more).

Bulk amorphous magnetic components will magnetize and demagnetize more efficiently than components made from other iron-base magnetic metals. When used as the rotor or stator in an electric motor, the bulk amorphous metal component will generate less heat than a comparable component made from another iron-base magnetic metal when the two components are magnetized at identical induction and frequency. The electric motor using the bulk amorphous metal component can therefore be designed to operate: (i) at a lower operating temperature; (ii) at higher induction to achieve reduced size and weight; or (iii) at higher frequency to achieve reduced size and weight, or to achieve superior motion control, when compared to electric motors using components made from other iron-base magnetic metals.

It is a further advantage that the motor of the invention can be designed with high pole count. The rotational speed of a motor is proportional to the ratio of electrical excitation frequency and pole count. The use of the low core loss component disclosed herein allows electrical excitation at a frequency that is much higher than would be possible in a conventional motors using other known soft magnetic materials, given their higher core losses. As a result the designer is afforded much more freedom in the choice of pole count and excitation frequency for a given speed. A high pole count motor may be chosen which operates with acceptable core loss at maximum speed but which also retains acceptable power and torque performance over a wide range of excitation frequencies (and thus rotational speeds). In some applications this flexibility means that a load may be driven is directly without need of a gearbox with its attendant complexity, need for service, and degradation of efficiency.

As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement the excitation is generally chosen such that the magnetic induction is homogeneous in the sample and varies sinusoidally with time at a frequency "f" and with a peak amplitude $B_{max}$. The core loss is then determined by known electrical measurement instrumentation and techniques. Loss is conventionally reported as watts per unit mass or volume of the magnetic material being excited. It is known in the art that loss increases monotonically with f and $B_{max}$. Most standard protocols for testing the core loss of soft magnetic materials used in components of motors {e.g. ASTM Standards A912-93 and A927 (A927M-94)} call for a sample of such materials which is situated in a substantially closed magnetic circuit, i.e. a configuration in which closed magnetic flux lines are completely contained within the volume of the sample. On the other hand, a magnetic material as employed in a motor component such as a rotor or a stator is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The bulk magnetic component of the invention advantageously exhibits low core loss over a wide range of flux densities and frequencies even in an open-circuit configuration.

Without being bound by any theory, it is believed that the total core loss of the low-loss bulk amorphous metal component of the invention is comprised of contributions from hysteresis losses and eddy current losses. Each of these two contributions is a function of the peak magnetic induction $B_{max}$ and of the excitation frequency f. Prior art analyses of core losses in amorphous metals (see, e.g., G. E. Fish, J. Appl. Phys. 57, 3569 (1985) and G. E. Fish et al., J. Appl. Phys. 64, 5370(1988)) have generally been restricted to data obtained for material in a closed magnetic circuit.

The total core loss $L(B_{max}, f)$ per unit mass of the bulk magnetic component of the invention may be essentially defined by a function having the form $$L(B_{max}, f) = c_1 f(B_{max})^n + c_2 f^q (B_{max})^m$$

wherein the coefficients $c_1$ and $c_2$ and the exponents n, m, and q must all be determined empirically, there being no known theory that precisely determines their values. Use of this formula allows the total core loss of the bulk magnetic component of the invention to be determined at any required operating induction and excitation frequency. It is generally found that in the particular geometry of a motor rotor or stator the magnetic field therein is not spatially uniform. Techniques such as finite element modeling are known in the art to provide an estimate of the spatial and temporal variation of the peak flux density that closely approximates the flux density distribution measured in an actual motor or generator. Using as input a suitable empirical formula giving the magnetic core loss of a given material under spatially uniform flux density, these techniques allow the corresponding actual core loss of a given component in its operating configuration to be predicted with reasonable accuracy by numerical integration over the component volume.

The measurement of the core loss of the magnetic component of the invention can be carried out using various methods known in the art. A method especially suited for measuring the present component may be described as follows. The method comprises forming a magnetic circuit with the magnetic component of the invention and a flux closure structure means. Optionally the magnetic circuit may comprise a plurality of magnetic components of the invention and a flux closure structure means. The flux closure structure means preferably comprises soft magnetic material having high permeability and a saturation flux density at least equal to the flux density at which the component is to be tested. Preferably, the soft magnetic material has a saturation flux density at least equal to the saturation flux density of the component. The flux direction along which the component is to be tested generally defines first and second opposite faces of the component. Flux lines enter the component in a direction generally normal to the plane of the first opposite face. The flux lines generally follow the plane of the amorphous metal strips, and emerge from the second opposing face. The flux closure structure means generally comprises a flux closure magnetic component which is constructed preferably in accordance with the present invention but may also be made with other methods and materials known in the art. The flux closure magnetic component also has first and second opposing faces through which flux lines enter and emerge, generally normal to the respective planes thereof. The flux closure component opposing faces are substantially the same size and shape to the respective faces of the magnetic component to which the flux closure component is mated during actual testing. The flux closure magnetic component is placed in mating relationship with its first and second faces closely proximate and substantially proximate to the first and second faces of the magnetic component of the invention, respectively. Magnetomotive force is applied by passing current through a first winding encircling either the magnetic component of the invention or the flux closure magnetic component. The resulting flux density is determined by Faraday's law from the voltage induced in a second winding encircling the magnetic component to be tested. The applied magnetic field is determined by Ampere's law from the magnetomotive force. The core loss is then computed from the applied magnetic field and the resulting flux density by conventional methods.

Figure 4:
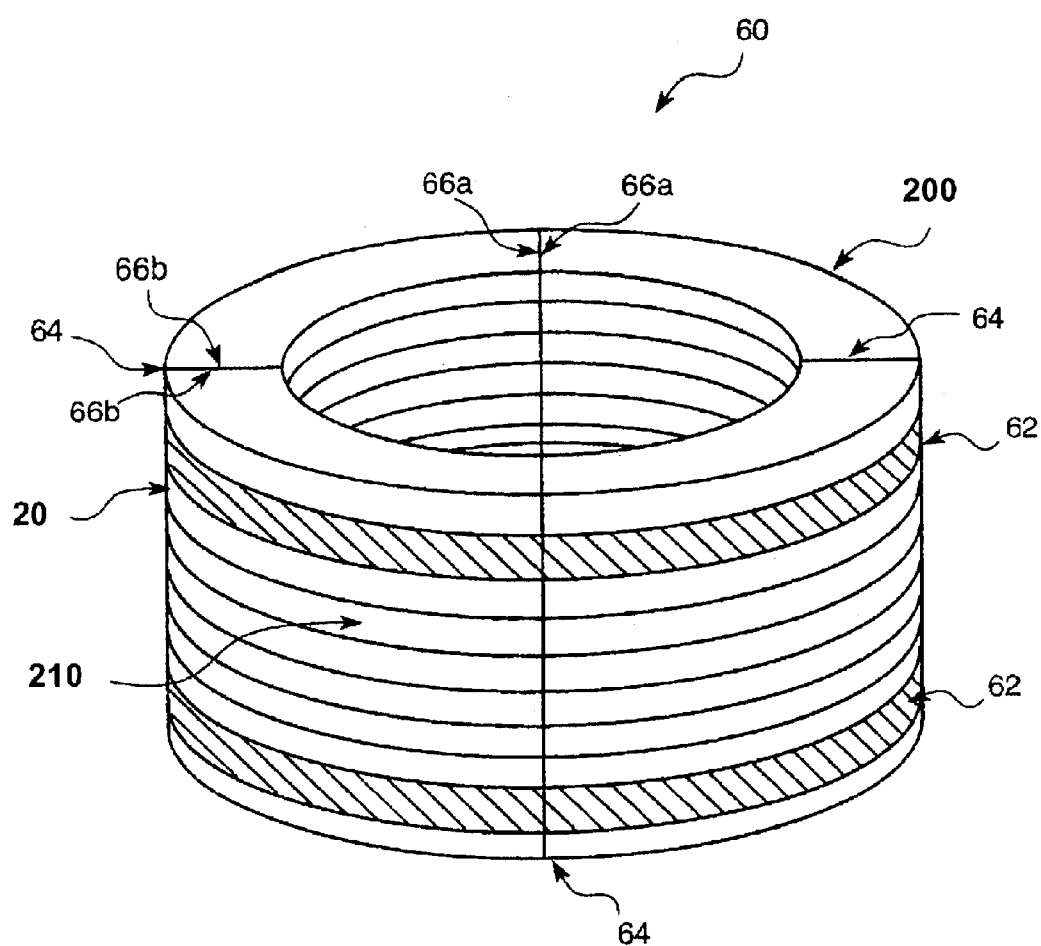
FIG. 4 is a perspective view of an assembly for testing bulk amorphous metal magnetic components, comprising four components, each having the shape of a polyhedron with oppositely disposed arcuate surfaces, and assembled to form a generally right circular, annular cylinder.

Referring to FIG. 4, there is illustrated an assembly 60 for carrying out one form of the testing method described above which does not require a flux closure structure means. Assembly 60 comprises four arcuate bulk amorphous metal magnetic components 200 of the invention. Each of the components 200 is a substantially identical right circular, annular, cylindrical segment subtending a 90° arc with arcuate surfaces 210 of the form depicted in FIG. 2B. Each component has a first opposite face 66a and a second opposite face 66b. The components 200 are situated in mating relationship to form assembly 60 which generally has the shape of a right circular cylinder. First opposite face 66a of each component 200 is located proximate to, and generally aligned parallel with, the corresponding first opposite face 66a of the component 200 adjacent thereto. The four sets of adjacent faces of components 200 thus define four gaps 64 equally spaced about the circumference of assembly 60. The mating relationship of components 200 may be secured by bands 62. Assembly 60 forms a magnetic circuit with four permeable segments (each comprising one component 200) and four gaps 64. Two copper wire windings (not shown) are toroidally threaded through the assembly 60. An alternating current of suitable magnitude is passed through the first winding to provide a magnetomotive force that excites assembly 60 at the requisite frequency and peak flux density. The resulting flux lines are generally within the plane of strips 20 and directed circumferentially. Voltage indicative of the time varying flux density within each of components 200 is induced in the second winding. The total core loss is determined by conventional electronic means from the measured values of voltage and current and apportioned equally among the four components 200.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Preparation and Testing of an Amorphous Metal Stator

Laminations for an amorphous metal stator for an inside-out spindle drive electric motor are cut by a photolithographic etching process from $Fe_{80}B_{11}Si_9$ amorphous metal ribbon about 22 μm thick. Each lamination comprises a central annular region having a generally toroidal shape and a plurality of teeth extending radially outward from the central annular region as depicted generally by FIG. 3D. The annular region has approximate inside and outside diameters of about 9 and 11 mm, respectively. The outside diameter of the component measured at the periphery of the teeth is about 25 mm. The laminations are heat-treated at a temperature of 350–400° C. for 0.5–3 h to enhance the soft magnetic properties thereof. About 120 laminations are then stacked to form a generally cylindrical structure having a height of about 4.2 mm. The stack is immersed in a low viscosity, heat-activated epoxy which is allowed to impregnate and infiltrate the spaces between adjacent laminations. The epoxy used is Epoxylite™ 8899, diluted 1:5 by volume with acetone to achieve a suitable viscosity. The stack is held in registry in a fixture and compressed slightly to a height of about 4 mm to enhance the packing density of the stack. The impregnated stack is then exposed to a temperature of about 177° C. for approximately 2.5 hours to activate and cure the epoxy resin solution. After cooling the stack is removed from the fixture and electrophoretically coated with 3M ScotchCast™ Electrical Resin 5133 to form a stator suitable for use in an inside-out motor.

The magnetic properties of the stator are tested by affixing primary and secondary electrical windings encircling the central annular region. The primary winding is excited by a source of AC current of the requisite frequency and amplitude; the maximum flux density achieved is calculated from the induced voltage appearing across the secondary winding assuming the flux is carried completely in the central annular region, effectively neglecting any flux carried in the teeth near their root. The excitation is adjusted to provide a series of test points of defined frequency and flux density. Core loss is determined with a Yokogawa 2532 wattmeter.

Table 1 depicts the core loss of the stator core for a series of test points having the values of frequency "f" and peak induction level "$B_{max}$" listed. The values of $B_{max}$ are determined using the aforementioned approximation. The stator core in this embodiment exhibits advantageously low core losses over a range of frequencies extending from DC up to 2 kHz. Notably, the losses at 50 Hz (0.05 kHz) are about 0.21 W/kg at 1.0 T; at 400 Hz (0.4 kHz) the losses are about 1.6 W/kg at 1.0 T and 2.8 W/kg at 1.3 T; at 800 Hz (0.8 kHz) the losses are about 3.3 W/kg at 1.0 T and 5.7 W/kg at 1.3 T; and at 2000 Hz (2 kHz) the losses are about 9.5 W/kg at 1.0 T and 14.8 W/kg at 1.3 T.

Non-linear regression methods are used to characterize the loss behavior of the stator core using a function of the form $L(B_{max}, f) = c_1 f (B_{max})^n + c_2 f^q (B_{max})^m$. Suitable values of the coefficients $c_1$ and $c_2$ and the exponents n, m, and q are determined empirically. It is found that a function $L = 0.005 f (B_{max})^{1.5} + 0.000012 f^{1.5} (B_{max})^{1.6}$ describes the core loss behavior. That is, the measured value of core loss at each of the test points (f, $B_{max}$) listed in Table 1 is less than the corresponding predicted value calculated using the function $L=0.005 \, f \, (B_{max})^{1.5}+0.000012 \, f^{1.5} \, (B_{max})^{1.6}$, which predicted values are set forth in the final column of Table 1.

The low values of core loss achieved render the stator core especially suited for use in a high rotational speed motor in which the electrical frequency may be as high as 1–2 kHz or more.

TABLE 1

| Frequency (kHz) | $B_{max}$ (Tesla) | Measured Core Loss (W/kg) | Predicted Core Loss (W/kg) |
|---|---|---|---|
| 0.2 | 0.2 | 0.071 | 0.092 |
| 0.4 | 0.2 | 0.141 | 0.186 |
| 0.8 | 0.2 | 0.283 | 0.378 |
| 1.0 | 0.2 | 0.354 | 0.476 |
| 1.5 | 0.2 | 0.495 | 0.724 |
| 2.0 | 0.2 | 0.778 | 0.976 |
| 0.05 | 0.4 | 0.071 | 0.064 |
| 0.1 | 0.4 | 0.141 | 0.129 |
| 0.2 | 0.4 | 0.212 | 0.261 |
| 0.4 | 0.4 | 0.424 | 0.528 |
| 0.8 | 0.4 | 0.920 | 1.075 |
| 1.0 | 0.4 | 1.202 | 1.353 |
| 1.5 | 0.4 | 1.839 | 2.058 |
| 2.0 | 0.4 | 2.617 | 2.778 |
| 0.05 | 0.6 | 0.071 | 0.118 |
| 0.1 | 0.6 | 0.212 | 0.238 |
| 0.2 | 0.6 | 0.424 | 0.480 |
| 0.4 | 0.6 | 0.849 | 0.972 |
| 0.8 | 0.6 | 1.698 | 1.979 |
| 1.0 | 0.6 | 2.193 | 2.491 |
| 1.5 | 0.6 | 3.395 | 3.794 |
| 2.0 | 0.6 | 4.810 | 5.122 |
| 0.05 | 0.8 | 0.141 | 0.182 |
| 0.1 | 0.8 | 0.283 | 0.366 |
| 0.2 | 0.8 | 0.566 | 0.739 |
| 0.4 | 0.8 | 1.202 | 1.498 |
| 0.8 | 0.8 | 2.476 | 3.052 |
| 1.0 | 0.8 | 3.183 | 3.843 |
| 1.5 | 0.8 | 5.022 | 5.854 |
| 2.0 | 0.8 | 7.073 | 7.906 |
| 0.05 | 1.0 | 0.212 | 0.254 |
| 0.1 | 1.0 | 0.354 | 0.512 |
| 0.2 | 1.0 | 0.778 | 1.034 |
| 0.4 | 1.0 | 1.627 | 2.096 |
| 0.8 | 1.0 | 3.325 | 4.272 |
| 1.0 | 1.0 | 4.315 | 5.379 |
| 1.5 | 1.0 | 6.791 | 8.197 |
| 2.0 | 1.0 | 9.478 | 11.073 |
| 0.05 | 1.2 | 0.283 | 0.334 |
| 0.1 | 1.2 | 0.495 | 0.673 |
| 0.2 | 1.2 | 1.061 | 1.360 |
| 0.4 | 1.2 | 2.122 | 2.758 |
| 0.8 | 1.2 | 4.386 | 5.622 |
| 1.0 | 1.2 | 5.588 | 7.081 |
| 1.5 | 1.2 | 8.771 | 10.792 |
| 2.0 | 1.2 | 12.237 | 14.582 |
| 0.1 | 1.3 | 0.707 | 0.759 |
| 0.2 | 1.3 | 1.415 | 1.534 |
| 0.4 | 1.3 | 2.829 | 3.111 |
| 0.8 | 1.3 | 5.659 | 6.342 |
| 1.0 | 1.3 | 7.073 | 7.989 |
| 1.5 | 1.3 | 10.610 | 12.177 |
| 2.0 | 1.3 | 14.854 | 16.455 |

EXAMPLE 2

Figure 5:
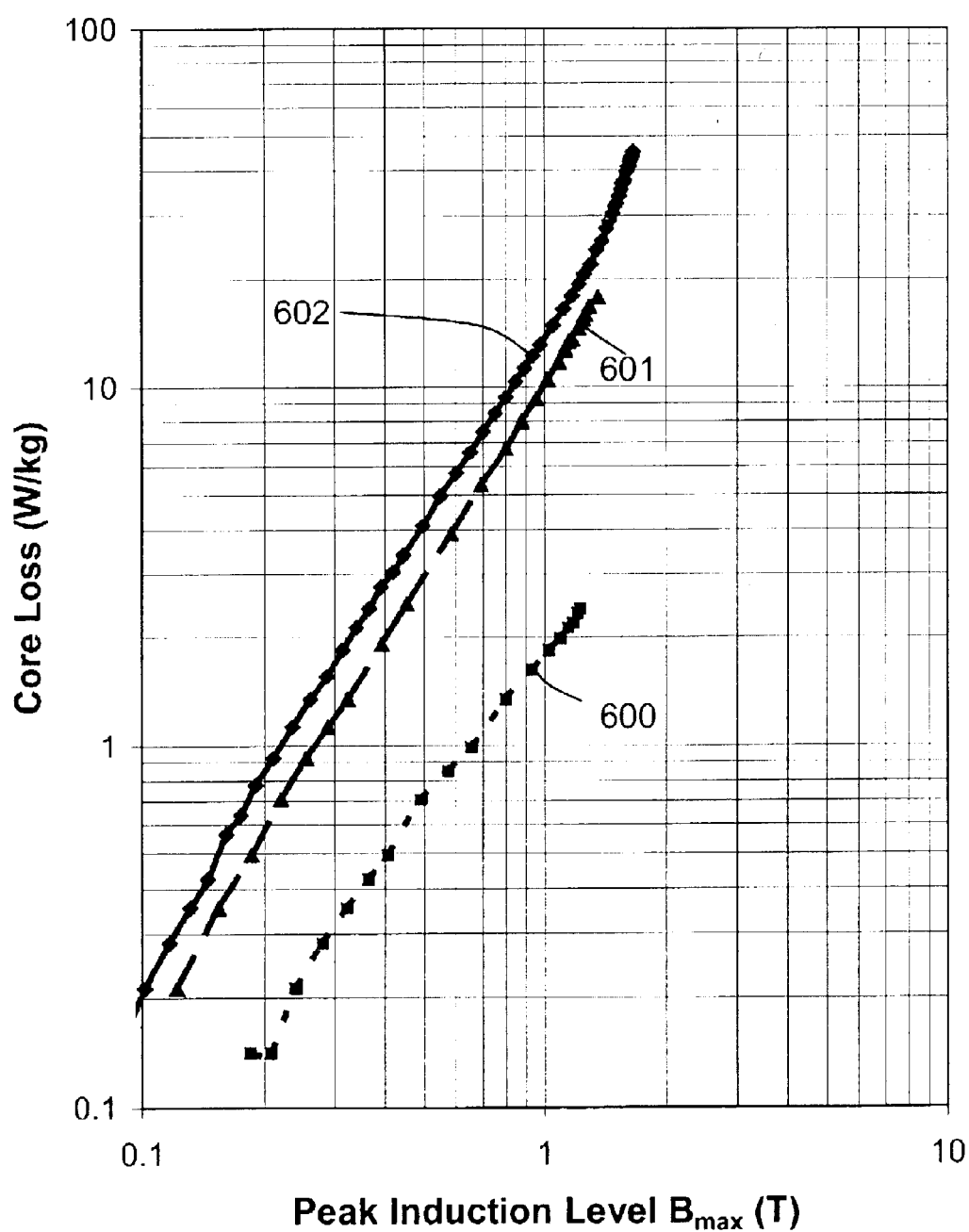
FIG. 5 is a graph depicting the 400 Hz core loss behavior of an amorphous metal stator of the invention and of two comparison stators constructed with non-oriented electrical steels.
Figure 6:
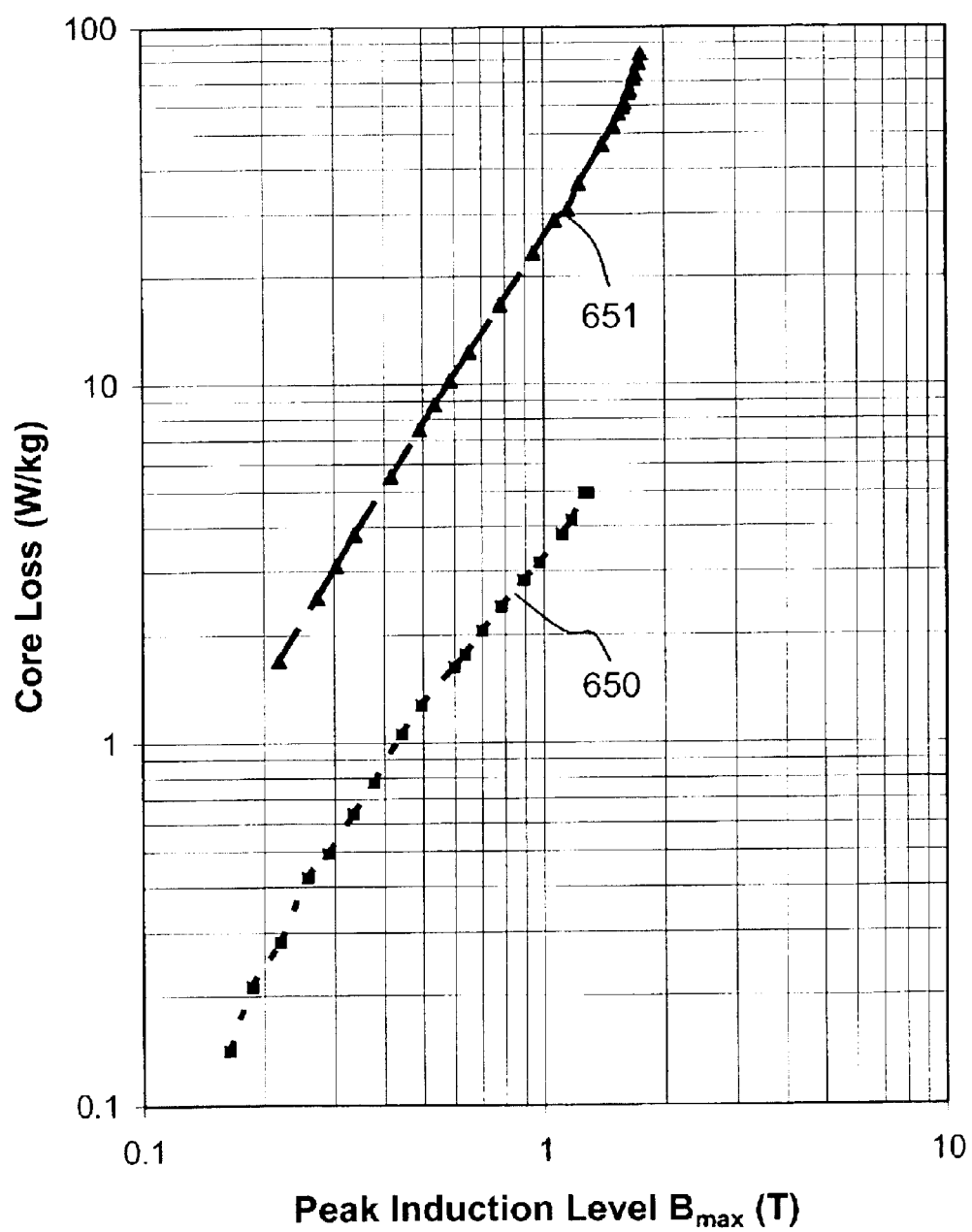
FIG. 6 is a graph depicting the 800 Hz core loss behavior of an amorphous metal stator of the invention and a comparison stator constructed with non-oriented electrical steel.

Comparison of Stators Constructed with Amorphous Metal and Conventional Non-oriented Electrical Steels An amorphous metal stator is constructed of nominally 22 µm thick METGLAS SA-1 amorphous metal strip having nominal composition $Fe_{80}B_{11}Si_9$ and using photoetching, lamination, and impregnation techniques set forth in Example 1 above. A comparison stator C350 is constructed with the same overall dimensions and shape and using laminations punched from conventional non-oriented electrical steel nominally 350 µm thick. Such steel is frequently used in manufacturing conventional spindle drive motors. A second comparison stator C200 of identical geometry is constructed using a higher grade conventional non-oriented steel nominally 200 µm thick. Each of the stators is tested using primary and secondary windings encircling the central annular portion of the respective stator. Tests are carried out at excitation frequencies of 400 and 800 Hz and at a series of excitation levels of peak induction $B_{max}$. Measured core loss data are obtained using a Yokogawa 2532 wattmeter. The results are depicted by FIGS. 5 and 6, representing 400 and 800 Hz test points, respectively. In FIG. 5, the loss behavior of the amorphous metal stator of the invention as a function of peak induction $B_{max}$ is given by trace 600, while traces 601 and 602 represent the loss behavior of the C200 and C350 stators. Over a wide range of levels of $B_{max}$ the losses of the amorphous metal stator are at least a factor of 6 lower than the losses of stator C350. Although the 400 Hz losses of comparison stator C200 are about 60% those of stator C350, they are still more than about 4 times larger than those of the amorphous metal stator of the invention. Similarly advantageous core loss behavior is exhibited at 800 Hz, as depicted by FIG. 6, wherein trace 650 depicts the properties of the amorphous metal stator of the invention and trace 651 represents the behavior of comparison stator C200. The relative core loss advantage of the stator of the invention over comparison stator C200 is even larger at 800 Hz than at 400 Hz, the losses of the amorphous metal stator being approximately one sixth those of C200.

The substantially lower core losses of the amorphous metal stator beneficially improve the electrical efficiency of a high speed spindle motor incorporating the stator in accordance with the present invention.

EXAMPLE 3

Preparation of a Nanocrystalline Alloy Rectangular Prism

Laminations for a stator of an inside-out spindle drive motor are prepared by photoetching $Fe_{73.5}Cu_1Nb_3B_9Si_{13.5}$ amorphous metal ribbon, approximately 25 mm wide and 0.018 mm thick. Each lamination comprises a central annular region having a generally toroidal shape and a plurality of teeth extending radially outward from the central annular region as depicted generally by FIG. 3D. The annular region has approximate inside and outside diameters of about 9 and 11 mm, respectively. The outside diameter of the component measured at the periphery of the teeth is about 25 mm. The laminations are heat treated to form a nanocrystalline microstructure in the amorphous metal. The anneal is carried out by performing the following steps: 1) heating the parts up to 580° C.; 2) holding the temperature at approximately 580° C. for approximately 1 hour; and 3) cooling the parts to ambient temperature. About 160 of the heat-treated laminations are then stacked to form a generally cylindrical structure having a height of about 4.2 mm and immersed in a low viscosity, heat-activated epoxy which is allowed to impregnate and infiltrate the spaces between adjacent laminations. The epoxy used is Epoxylite™ 8899 diluted 1:5 by volume with acetone to achieve a suitable viscosity. The stack is held in registry in a fixture and compressed slightly to a height of about 4 mm to enhance the packing density of the stack. The impregnated stack is then exposed to a temperature of about 177° C. for approximately 2.5 hours to activate and cure the epoxy resin solution. After cooling the stack is removed from the fixture and electrophoretically coated with 3M ScotchCast™ Electrical Resin 5133 to form a stator suitable for use in an inside-out motor.

The magnetic properties of the stator are tested by affixing primary and secondary electrical windings encircling the central annular region. The primary winding is excited by a source of AC current of the requisite frequency and amplitude; the maximum flux density achieved is calculated from the induced voltage appearing across the secondary winding assuming the flux is carried completely in the central annular region, effectively neglecting any flux carried in the teeth near their root. The excitation is adjusted to provide requisite test points of defined frequency and flux density determined in accordance with the aforementioned approximation. Core loss is determined with a Yokogawa 2532 wattmeter.

The nanocrystalline alloy stator exhibits low core losses. Notably, the losses at 50 Hz (0.05 kHz) are about 0.21 W/kg at 1.0 T; at 400 Hz (0.4 kHz) the losses are about 1.6 W/kg at 1.0 T and 2.8 W/kg at 1.3 T; at 800 Hz (0.8 kHz) the losses are about 3.3 W/kg at 1.0 T and 5.7 W/kg at 1.3 T; and at 2000 Hz (2 kHz) the losses are about 9.5 W/kg at 1.0 T. and 14.8 W/kg at 1.3 T. As a result, the stator is rendering it suitable for use in a high speed, high efficiency electric motor.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. An electric motor having at least one low-loss bulk amorphous metal magnetic component comprised of a plurality of substantially similarly shaped layers of amorphous metal strips laminated together with an adhesive agent to form a polyhedrally shaped part, said low-loss bulk amorphous metal magnetic component, when operated at an excitation frequency "f" to a peak induction level $B_{max}$, having a core-loss less than about "L", wherein L is given by the formula $L=0.005 \, f \, (B_{max})^{1.5} + 0.000012 \, f^{1.5} \, (B_{max})^{1.6}$, the core loss, excitation frequency and peak induction level being measured in watts per kilogram, hertz, and teslas, respectively.

2. An electric motor as recited by claim 1, each of said amorphous metal strips having a composition defined essentially by the formula: $M_{70-85} \, Y_{5-20} \, Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta and W, and (ii) up to 10 atom percent of components (Y+Z) can be replaced by at least one of the non-metallic species In, Sn, Sb and Pb.

3. An electric motor as recited by claim 2, wherein said M component is substantially Fe, said Y component is substantially B, and said Z component is substantially Si.

4. An electric motor as recited by claim 2, wherein each of said ferromagnetic amorphous metal strips has a composition containing at least 70 atom percent Fe, at least 5 atom percent B, and at least 5 atom percent Si, with the proviso that the total content of B and Si is at least 15 atom percent.

5. An electric motor as recited by claim 4, wherein each of said strips has a composition defined essentially by the formula $Fe_{80}B_{11}Si_9$.

6. An electric motor as recited by claim 2, said amorphous metal strips having been heat treated to form a nanocrystalline microstructure therein.

7. An electric motor as recited by claim 6, wherein each of said amorphous metal strips has a composition defined essentially by the formula $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8.

8. An electric motor as recited by claim 6, wherein each of said amorphous metal strips has a composition defined essentially by the formula $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18.

9. An electric motor as recited by claim 1, wherein said bulk amorphous metal magnetic component comprises at least part of a stator of said electric motor.

10. An electric motor as recited by claim 1, wherein said bulk amorphous metal magnetic component comprises at least part of a rotor of said electric motor.

11. An electric motor as recited by claim 1, wherein said amorphous metal magnetic component comprises a rotor and a stator of said electric motor.

12. An electric motor as recited by claim 1, wherein said bulk amorphous metal magnetic component has a core-loss of less than or approximately equal to 2.8 watt-per-kilogram of amorphous metal material when operated at a frequency of approximately 400 Hz and a flux density of approximately 1.3 T.

13. An electric motor as recited by claim 1, wherein said bulk amorphous metal magnetic component has a core-loss of less than or approximately equal to 5.7 watts-per-kilogram of amorphous metal material when operated at a frequency of approximately 800 Hz and a flux density of approximately 1.3 T.

14. An electric motor as recited by claim 1, wherein said bulk amorphous metal magnetic component has a core-loss of less than or approximately equal to 9.5 watts-per-kilogram of amorphous metal material when operated at a frequency of approximately 2,000 Hz and a flux density of approximately 1.0 T.

15. An electric motor as recited by claim 9, said motor being selected from the group consisting of squirrel cage motors, reluctance synchronous motors and switched reluctance motors.

16. An electric motor as recited by claim 10, said motor being selected from the group consisting of variable reluctance motors, eddy current motors, squirrel cage motors, reluctance synchronous motors and switched reluctance motors.

17. An electric motor as recited by claim 1, wherein said adhesive agent is composed of at least one member selected from the group consisting of one and two part epoxies, varnishes, anaerobic adhesives, cyanoacrylates, and room-temperature-vulcanized (RTV) silicone materials.

18. An electric motor as recited by claim 17, said component being impregnated with said adhesive agent.

19. An electric motor as recited by claim 18, said component comprising impregnant flow enhancement means for enhancing the bonding of the laminations.

20. An electric motor as recited by claim 17, said adhesive agent being a low viscosity epoxy.

21. For use in an electric motor having a rotor and a stator, at least one low-loss bulk amorphous metal magnetic component comprising a plurality of substantially similarly shaped layers of amorphous metal strips laminated together with an adhesive agent to form a polyhedrally shaped part, wherein said low-loss bulk amorphous metal magnetic component when excited at a frequency f to a peak induction level $B_{max}$ has a core-loss less than about "L" wherein L is given by the formula L=0.005 f $(B_{max})^{1.5}$+0.000012 $f^{1.5}$ $(B_{max})^{1.6}$, said core loss, said excitation frequency and said peak induction level being measured in watts per kilogram, hertz, and teslas, respectively.

22. A magnetic component as recited by claim 21, wherein said magnetic component comprises at least part of said stator.

23. A magnetic component as recited by claim 21, wherein said magnetic component comprises at least part of said rotor.

24. A magnetic component as recited by claim 21, wherein each of said amorphous metal strips has a composition containing at least 70 atom percent Fe, at least 5 atom percent B, and at least 5 atom percent Si, with the proviso that the total content of B and Si is at least 15 atom percent.

25. A magnetic component as recited by claim 21, said component being impregnated by said adhesive agent.

26. A magnetic component as recited by claim 25, said adhesive agent being a low viscosity epoxy.

* * * * *